A. WILZIN.
AUTOMATIC MACHINE FOR MOLDING GLASS ARTICLES.
APPLICATION FILED MAR. 22, 1912.

1,251,156.

Patented Dec. 25, 1917.
7 SHEETS—SHEET 1.

Witnesses:

Inventor:
Arthur Wilzin
per
Lawrence Langan
Attorney.

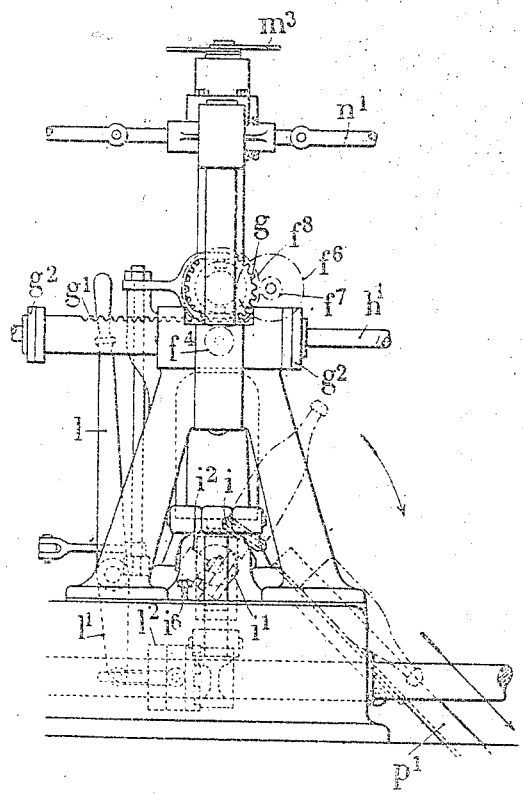
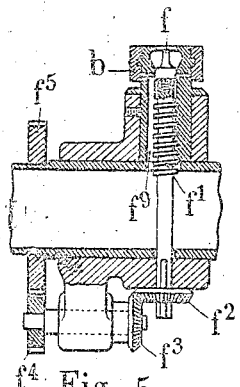
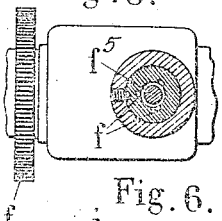
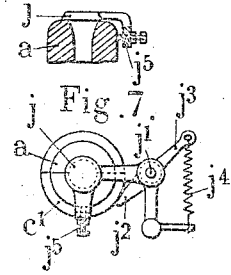
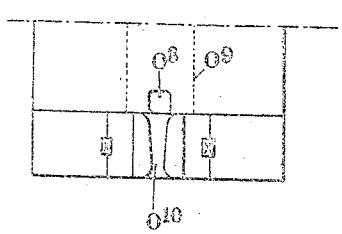
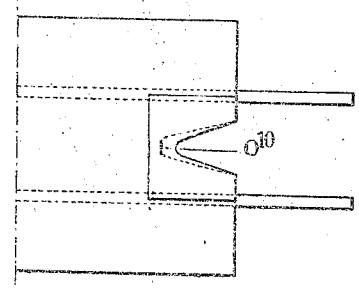

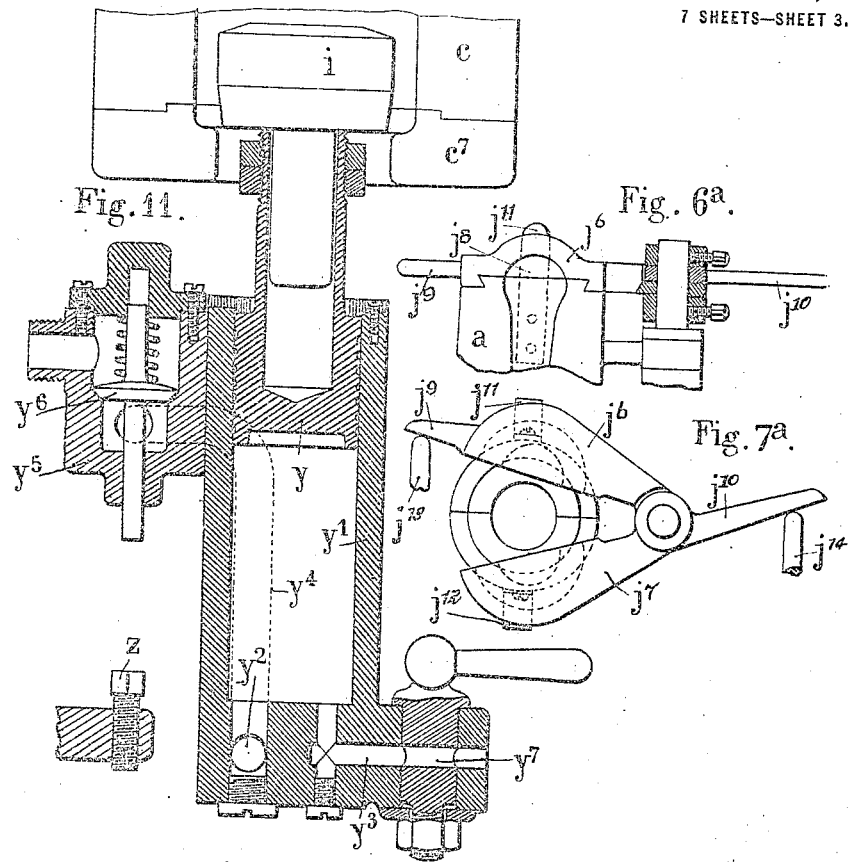
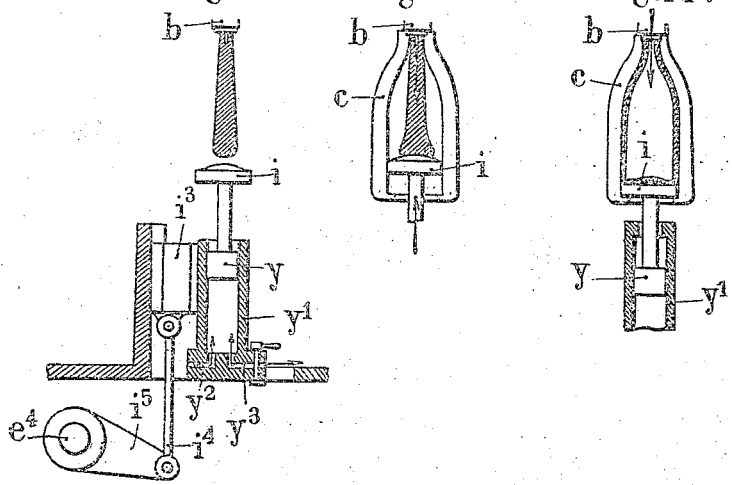

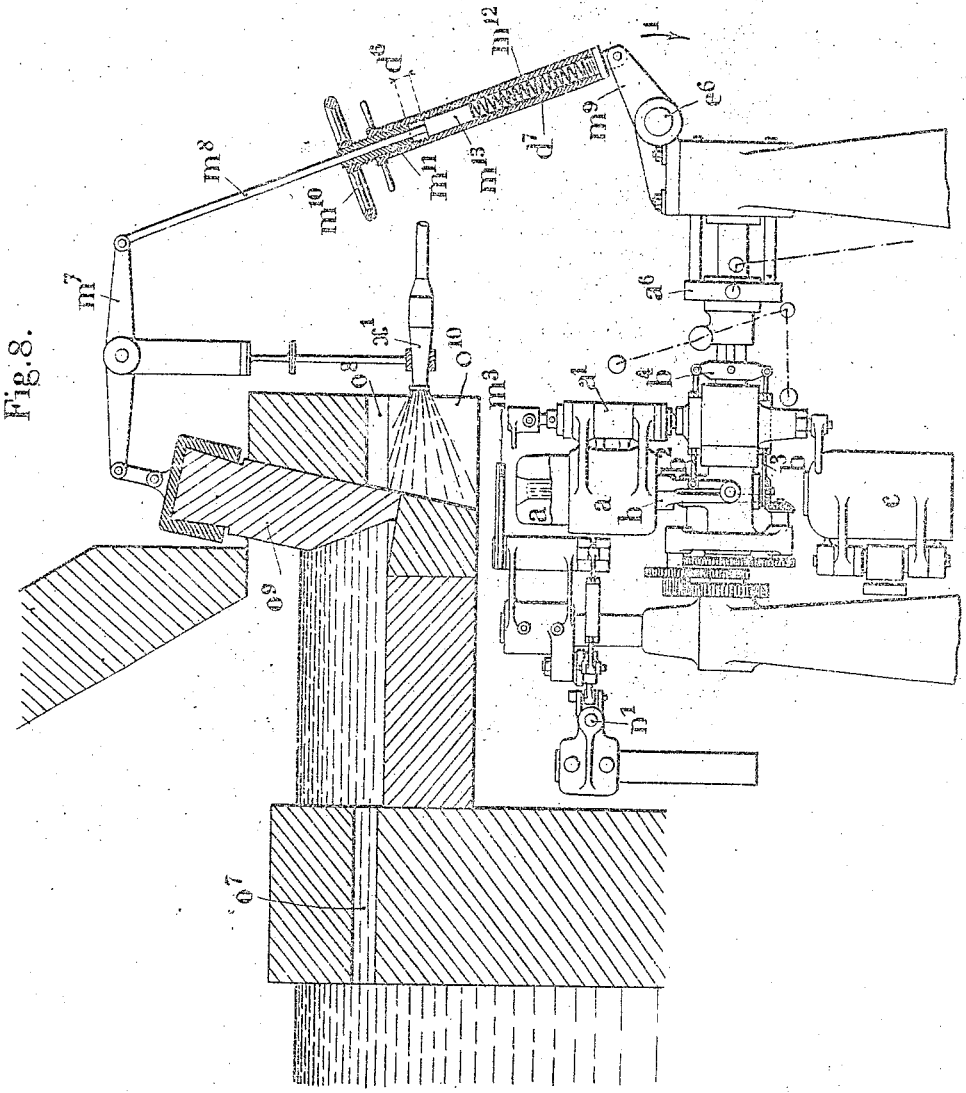

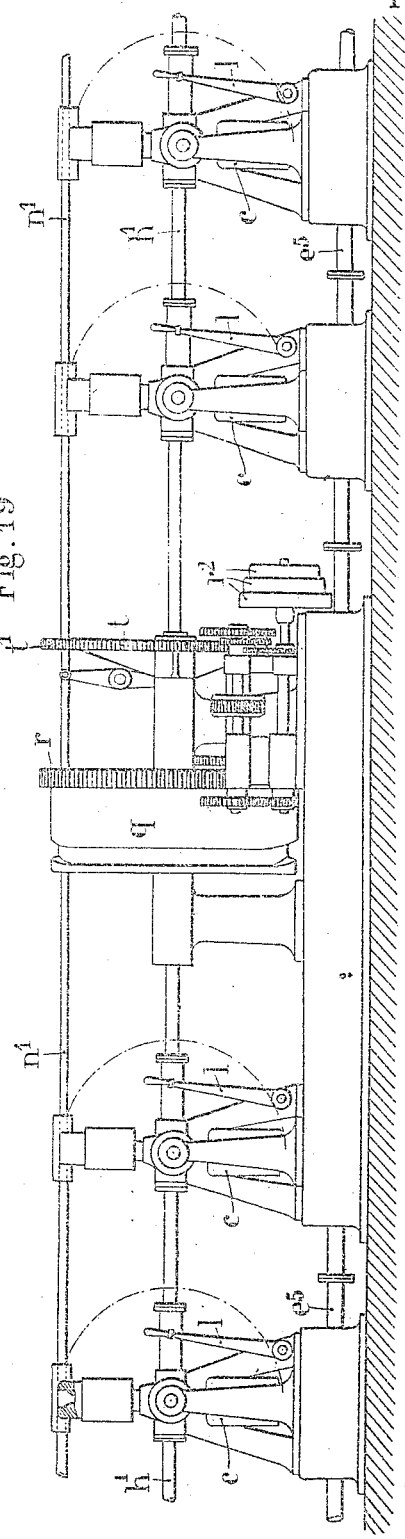

UNITED STATES PATENT OFFICE.

ARTHUR WILZIN, OF ST.-OUEN, FRANCE.

AUTOMATIC MACHINE FOR MOLDING GLASS ARTICLES.

1,251,156.          Specification of Letters Patent.          Patented Dec. 25, 1917.

Application filed March 22, 1912.   Serial No. 685,547.

*To all whom it may concern:*

Be it known that I, ARTHUR WILZIN, of 100 Boulevard Victor Hugo, St.-Ouen, Seine, Republic of France, engineer, have invented Automatic Machines for Molding Glass Articles, of which the following is a full, clear, and exact description.

In machines of this class, it is necessary to treat the glass differently in accordance with the chemical composition of the sand and of its other ingredients, in accordance with the heat of the furnace and according to the size and shape of the article to be produced. The degree of malleability, the tendency to "set" more or less quickly, or to remain malleable for a long time, and the conditions arising from differences in the bulk of the glass operated on, render it necessary to vary largely the periods of contact with the molds and the duration of the blowing operations.

The primary object of this invention is to provide mechanism adapted to meet the varying conditions above mentioned, and this I accomplish, in the specific form of my invention herein shown and described, by employing instead of the heretofore known mechanism including actuating cams for effecting certain operations such, for example, as opening and closing of the molds, transference of the parison, etc., and which time by their dwells the duration of the glass working periods, mechanism wherein cams which actuate such parts are themselves stopped in their rotation during the cycle of manufacture, and restarted, and by such stoppages and starting control the timing of the glass working periods, the restarting of these cams and the duration of their stoppage periods in a cycle being determined by a controlling device moved by a continuous motion through a cycle and at a rate corresponding to that of the cycle, and carrying cams or contacts which act upon clutches adapted to establish and interrupt connections between said actuating cams and a source of power, and adjustable to vary the times of the actuation of said clutches and thereby vary the starting points and stoppage periods of said acuating cams.
In this manner, it becomes possible to construct the actuating cams of small diameters and, consequently, much less expensively and of more convenient shape for placing before the furnace, and to vary the duration of the glass working periods to suit different compositions and heats of glass and different weights and shapes of the articles to be produced.

The ordinary cheap glass compositions, as used with hand-actuated machines, become available under these conditions.

Other objects of my said invention will more fully appear from the following detailed description, and the novel features will be more particularly pointed out in the accompanying claims.

In order to more fully describe my invention, reference will now be had to the accompanying drawings wherein:

Figure 1, shows in elevation a molding machine embodying one specific form of my invention;

Fig. 2, a plan view,

Fig. 3, an end view of said machine;

Figs. 4, 5, 6, 6ª, and 7ª, detail views thereof, and

Fig. 8, shows the application of an automatic glass purveying or gathering device to this machine.

Figs. 9 and 10 illustrate in front view and plan view respectively the tap hole of this glass purveying device.

Fig. 11 shows a pneumatically operated device for the bottom of the finishing mold.

Figs. 12, 13 and 14 illustrate the various positions of the bottom in connection with this pneumatic device.

Fig. 15 is an elevation of this driving machine.

Fig. 16 is a plan view and Fig. 17 is an end elevation of the driving machine.

Fig. 18 is an elevation showing the controlling device used in connection with the driving machine.

Fig. 19 shows the application of the invention to a plant comprising several machines which are all actuated by one and the same driving machine.

The molding machine (Figs. 1, 2, 3) comprises a parison mold $a$, a ring mold $b$ and a finishing mold $c$ and the molding carrying devices.

The measuring or parison mold $a$ serves for the reception of the quantity of melted glass necessary for the manufacture of an article and to roughly prepare the article. This mold is constituted by two similar parts pivoted to a pivot $c^1$. The opening and closing of the mold are produced by rods $a^2$ pivoted to levers $a^3$ oscillating on a pivot $a^4$; these levers are connected by a rod $a^5$ integral with a collar $a^6$ capable of turning and sliding upon a sleeve $d$; rollers carried by a lever $a^7$ are engaged in the collar; this lever oscillates about $a^8$ and is connected by a spring rod $a^9$ with a lever $a^{10}$ keyed upon a driving shaft $a^1$.

Figure 1:
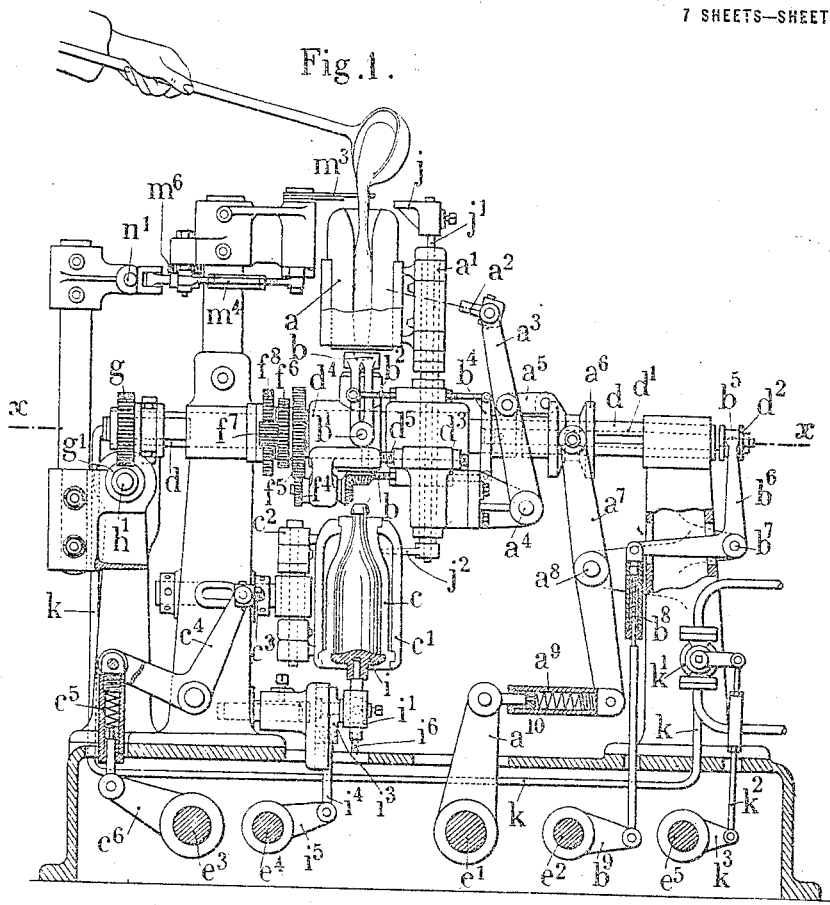
Figure 2:
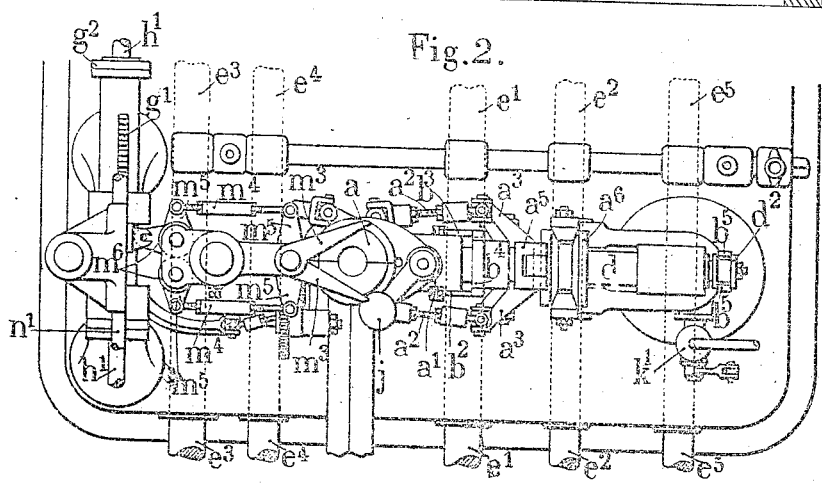
Figure 15:
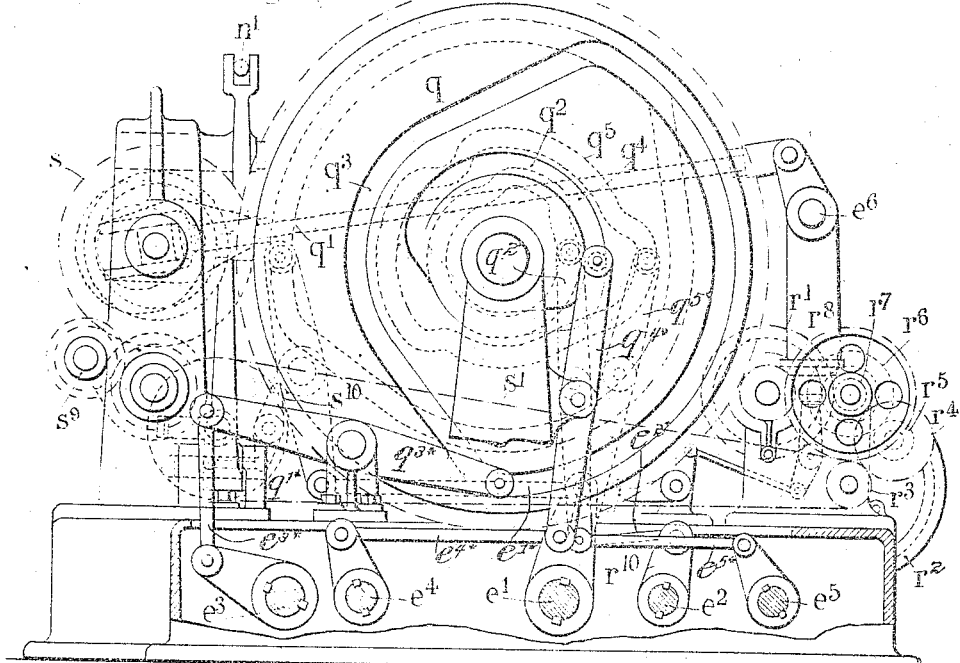
Figs. 15 to 18 illustrate the controlling and driving machine controlling the various movements of the actuating machine.

Below the parison mold the ring mold $b$ is located; this latter mold serves to impart the desired form to the neck of the bottle or other article. This ring mold is in two similar parts, as shown in Fig. 1, these parts oscillating about a pivot $b^1$; they are controlled respectively by rods $b^2$ and $b^3$ connected with a part $b^4$ which is able to slide longitudinally along the axis $x$—$x$ and which is operated by a rod $d^1$ arranged inside the sleeve $d$; this rod $d^1$ carries a collar $d^2$ in which rollers $b^5$ carried by a bent lever $b^6$ oscillating at $b^7$ are engaged. This lever is connected by a spring rod $b^8$ with a lever $b^9$ keyed upon a driving shaft $e^2$.

The punch $f$ (Fig. 4) which is to start the opening in the neck of the bottle or jar is placed within the ring mold. This punch is integral with a screw $f^1$ carrying a pinion $f^2$ meshing with another pinion $f^3$; this second pinion is driven by a train of gear wheels $f^4$, $f^5$, $f^6$, $f^7$ the latter of which forms a planet pinion and turns in rolling on a fixed toothed ring $f^8$. When these gears are actuated as hereinafter explained the screw $f^1$ rotates thus causing the punch to enter the neck of the parison or to withdraw it according to the direction of rotation. This construction of the punch actuating devices permits of manufacturing internally threaded bottles. Grooves $f^9$ (Figs. 4 and 5) enable compressed air to enter the articles to be molded for blowing it.

The shaft $a^1$ is carried by a support $d^3$ while the ring mold $b$ is carried by a support $d^4$; these two supports are connected by a screw $d^5$ (Fig. 1) which enables the position of the ring mold to be readily adjusted relatively to the parison mold.

The whole constituted by the parison mold, the ring mold and their supports and by a portion of their operating parts assumes a movement of alternating rotation through 180° around the axis $x$—$x$. This movement is produced by a pinion $g$ keyed upon the sleeve $d$; this pinion is in mesh with a compensator rack $g^1$, the movement of which is limited by stop nuts $g^2$ adjustable in position. The rack is controlled by a rod $h^1$ (Fig. 3).

The finishing mold $e$ embedded in its fitting $e^1$ is also in two parts hinged to a pivot $e^2$; rods $e^3$ jointed to a bent lever $e^4$ connected by a spring rod $e^5$ with a lever $e^6$ keyed upon a driving shaft $e^3$ open and close the finishing mold at the proper moments.

The bottom $i$ of the finishing mold is independent of the mold proper; this bottom is mounted on a part $i^1$ balanced by a counterweight $i^2$ and adapted to turn relatively to a slide block $i^3$. The slide block $i^3$ is controlled by a rod $i^4$ jointed to a lever $i^5$ keyed upon a driving shaft $e^4$. The slide block is thus able to receive movements of ascent and descent. In the movements of descent the counterweight $i^2$ encounters a fixed stop $i^6$ which causes the bottom $i$ to rock as shown in Fig. 3.

The parison mold may be closed by a cover $j$ fitted to a rod $j^1$ which also carries at its lower part a finger $j^2$ and an arm $j^3$ to which a spring $j^4$ (Figs. 1 and 7) is attached. Under the influence of a spring $j^4$ the cover $j$ closes and assumes exactly the desired position owing to a stop screw $j^5$ (Fig. 6) adjustable on the cover and which strikes against the side of the mold. In the position shown in Fig. 1 however, the finger $j^2$ strikes against the finishing mold which keeps the cover of the parison mold open.

Instead of employing a flat bottom for closing the measuring mold as shown at $j$ in Figs. 6 and 7, it becomes desirable in certain cases to use a concave bottom, as shown at $j^6$ in Fig. 6a. It then becomes necessary so as to permit of clearing the glass which has entered this concave bottom $j^6$ to remove it from the opening of the measuring mold by splitting said bottom and separating the two halves $j^7$ $j^8$ in opposite directions as shown by Fig. 7a. This separation takes place during the latter part of up-stroke of the measuring mold owing to projections $j^9$ $j^{10}$, striking respectively the stationary butting pieces $j^{11}$ $j^{12}$. Leaf springs $j^{13}$ $j^{14}$ respectively secured on each half of the measuring mold always tend to close the two parts of the cover.

The compressed air for blowing reaches the ring mold through a pipe $k$ connected with a two way cock $k^1$ which is able to place the pipe $k$ alternately in communication with a compressed air supply or with a vacuum.

The cock $k^1$ is controlled by a rod $k^2$ and a lever $k^3$ keyed upon a driving shaft $e^5$.

The shafts $e^1$ $e^2$ $e^3$ $e^4$ $e^5$ pass through the machine and are actuated by the driving mechanism illustrated in Figs. 15, 16, 17 and 18 and which will be described hereafter.

These shafts can be declutched simultaneously by a lever $l$ (Fig. 3) controlling five levers $l^1$ corresponding to five clutch sleeves $l^2$ sliding on the shafts and capable of rendering the levers $a^{10}$ $b^9$ $e^6$ $i^5$ and $k^3$ fast with the corresponding shafts or of declutching them. Similarly the pinion $g$ can be declutched from the rack $g^1$ by shifting the pinion laterally.

The glass may be poured by hand into the measuring mold as illustrated in Fig. 1, or it may be automatically supplied by a device of the type illustrated in Fig. 8.

In this device, the furnace, provided with the usual partition allowing the refined glass to pass through the orifice $o^7$ into the collecting chamber and to the outlet $o^8$ provided in same. This outlet can be closed by means of an obturator $o^9$ adapted to slide up and down on the inside wall of the furnace. This obturator is raised or lowered by means of a lever $m^7$ and of a rod $m^8$ actuated by arm $m^9$ mounted on the shaft $e^6$.

The size of the opening through which the glass passes, is regulated by causing the stroke of the obturator $o^9$ to vary. This result is obtained by means of a hand wheel $m^{10}$ attached to a threaded sleeve $m^{11}$ which is fitted to the inside of a cylinder $m^{12}$.

When the arm $m^9$ oscillates in the direction indicated by the arrow 1, the first portion of the stroke is idle to the extent of the lost motion $d^6$. During this time, the rod $m^8$ remains stationary. When the sleeve $m^{11}$ strikes upon the piston $m^{13}$ connected with the rod $m^8$, the latter is displaced and the obturator $o^9$ is raised. By reducing the lost motion ($d^6$), the lift of the obturator is increased; by increasing $d^6$ it is reduced.

At the end of the stroke of $m^9$, a spring $d^7$ prevents such shock as would be liable to injure the tap hole stone or the obturator.

The orifice $o^8$ opens out into a channel (Figs. 8, 9 and 10) formed in a stone block which may be easily removed. Opposite to this channel, a blowpipe $x^1$ may be placed.

Below the tap hole is mounted a pair of shears $m^3$ (Fig. 2); these shears are actuated by connecting rods $m^4$ and levers $m^5$ the movements of which are derived from two pinions $m^6$ one of which is actuated by a rod $n^1$ operated by the driving machine illustrated in Figs. 15, 16, 17, 18 and described hereafter.

The operation of the above described molding machine can be briefly described as follows:

Just before glass is to flow into them, the measuring and ring molds are stopped in the position represented in Fig. 1; the cover is open and the two molds are closed, the interior being in communication with the vacuum by the intermediary of the cock $k^1$.

At this moment, the shears $m^3$ are open.

The glass poured into the measuring mold and the ring mold completely fills them under the influence of the vacuum.

At the moment at which a sufficient quantity of glass has fallen into the parison mold the rod $n^1$ is displaced and closes the shears $m^3$ which sever the thread of glass.

The parison mold being thus filled with glass the rod $h^1$ is displaced and the rack $g^1$ inverts the parison mold $a$ around the axis $x-x$. As soon as this movement commences the cover $j$ closes under the influence of its springs $j^4$. At the same time the pinion $f^7$ running on the toothed ring $f^8$ causes the rotation of the train of gear wheels $f^3-f^5$ $f^4$ and the withdrawal of the punch $f$.

While the parison mold is being reversed the finishing mold $c$ opens under the influence of the shaft $e^3$; the bottom $i$ is lowered by the shaft $e^4$ and rocks, as shown in Fig. 3 so that the previously finished bottle which had hitherto remained in the finishing mold is overturned and discharged into a chute $p^1$.

The shaft $e^5$ causes the cock $k^1$ to open and places the conduit $k$ in communication with the compressed air supply; the blowing of the parison may commence as soon as the parison has reached the lowest position or slightly before and may continue for a certain time.

The shaft $e^5$ turns and stops the blowing; the shafts $e^1$ $e^3$ $e^4$ then turn in causing the parison mold to open, the finishing mold to close and the bottom of the finishing mold to ascend against the bottom of the parison.

The shaft $e^5$ again opens the compressed air supply and the blowing of the bottle in the finishing mold takes place.

The shaft $e^2$ is then actuated and opens the ring mold whereupon the rack $g^1$ reverses the parison and ring molds which return to the position represented in Fig. 1. The blown bottle remains in the finishing mold.

A cycle has then been accomplished and the same operations are repeated indefinitely, one article being manufactured during each cycle.

As has been seen the ring mold is disengaged from the bottle as soon as the blowing is finished, leaving the bottle in the finishing mold. This arrangement permits of leaving the bottle much longer in this finishing mold after it has been blown with the object of cooling it sufficiently to permit of dispensing with "cooling pots" and this without increasing the duration of the cycle as in other automatic machines, for the reason that the bottle remains inclosed in the finishing mold throughout the entire period of the time during which the ring and parison molds are returning to the gathering aperture, throughout the entire duration of the gathering during the shearing and during a large part of the return movement of the parison mold toward the finishing mold. In other words during about three-fourths of the entire cycle, the bottle is contained in the finishing mold, and only leaves this mold at the moment of its ejection into the inclined chute which conducts it to the annealing furnace, just prior to the arrival of the measuring mold. In this manner the period of cooling after blowing is not added to the duration of the cycle as in other methods of manufacture, but is comprised therein so that the number of bottles manufactured per minute may be from 25 to 30% greater than with other automatic machines. In this manner a considerable increase in the speed of manufacture is obtained while avoiding the deformation of the bottles which is produced if they leave the machine while still too malleable.

The contact of the ring mold with the neck ceases immediately after the blowing, the body of the bottle then remaining inclosed in the finishing mold; this method of procedure serves to diminish the excessive cooling of the neck relatively to the body which in almost all other methods of manufacture produces wasters or necessitates the reheating of the neck before the bottles are conveyed to the arch.

In case of the gathering being effected automatically as illustrated in Fig. 8, the obturator $o^9$ rises and uncovers to a greater or lesser extent the tap hole as soon as the parison mold has reached the filling position. The glass flows out and during the time it passes in the channel $o^{10}$, is heated by the flame of the blow pipe which prevents its temperature from lowering unduly. The glass therefore reaches the parison mold in a very hot state. When the requisite quantity of glass has been drawn off, the obturator $o^9$ closes the orifice $o^8$ and the shears $m^3$ close and cut off the thread of glass which will form.

During the inversion movement which follows the gathering a scraper may pass against the top stone in order to remove from it the particles of glass which might adhere.

The arrangement of the tap hole as shown in Fig. 8 has the advantage of allowing of easy cleaning and repairing and of permitting the use of a blowpipe, without risk of overheating any of the parts of the machine.

Figs. 11 to 14 illustrate a pneumatically operated device for the bottom $i$ of the finishing mold.

This device has for its purpose to prevent perforating of the parison during the blowing operation, which would happen whenever the parison bottom is not maintained by the bottom mold thus permitting of the compressed air to pass through.

The bottom $i$ is carried by a piston $y$ working in a cylinder $y^1$ mounted on the slide $i^3$ (Fig. 12); the latter is actuated by a connecting rod $i^4$ and a lever $i^5$ mounted on the shaft $e^4$ similar in that respect to what is shown in Fig. 1.

The bottom of the cylinder is provided with two air inlets $y^2$ $y^3$, the first communicating through pipe $y^4$ with the compressed air supply, and the second through cock $y^7$ with the atmosphere.

A fixed butt-screw $z$ is arranged opposite the protruding tail of valve $y^6$.

The valve box $y^5$ and the butt-screw are in reality placed at 90° from the position in which they are shown in Fig. 11 for the sake of more convenient illustration.

The devices operate as follows:
Supposing the cylinder $y^1$ to be in its lowest position (Fig. 12); in this position the tail of the valve $y^6$ touches the butt-screw so that this valve is opened and the compressed air arrived under the piston $y$ by inlet $y^2$. The cock $y^7$ is kept sufficiently closed to offer to the escape of the compressed air, enough resistance to maintain the piston raised, as illustrated in Fig. 12.

When the parison mold opens, it leaves the parison suspended by the ring mold over the bottom $i$ as shown in Fig. 12. At this moment, the shaft $e^4$ turns through a certain angle, raises the slide $i^3$, and with it, the cylinder $y^1$, the piston $y$ and bottom $i$, which latter presses against the parison, as shown in Fig. 13.

The raising movement of the cylinder $y^1$ has interrupted the contact between the butt-screw $z$ and the tail of the valve $y^6$, allowing the valve to close and thereby cutting off the compressed air. The compressed air contained in the cylinder maintains the piston in its upper position, by reason of the resistance this air encounters in passing through the passage of the cock $y^7$.

The finishing mold $c$ then closes around the parison thus elastically supported at its lower end, and the blowing in the mold commences.

The downward pressure produced by the blowing drives the bottom $i$ downward (Fig. 14); the speed on this downward movement can be regulated by opening the cock $y^7$ to a greater or less extent.

The blowing then stops and the manufacture of the article is terminated. The shaft $e^4$ rotates in the reverse direction and lowers the cylinder $y^1$, which brings it back to the initial position.

The motor group will now be described; it comprises three series of parts (Figs. 15 to 18).

(a) A series of cams imparting the desired movements to the shafts $e^1$, $e^2$, $e^3$, $e^4$, $e^5$ and to the rod $h^1$.

(b) Another series of cams controlling the rod $n^1$ of the shearing mechanism and the shaft $e^6$ of the said mechanism.

(c) A special part, termed the control wheel, which determines the times and durations of the glass working operations relatively to the mechanical phases.

Figure 16:
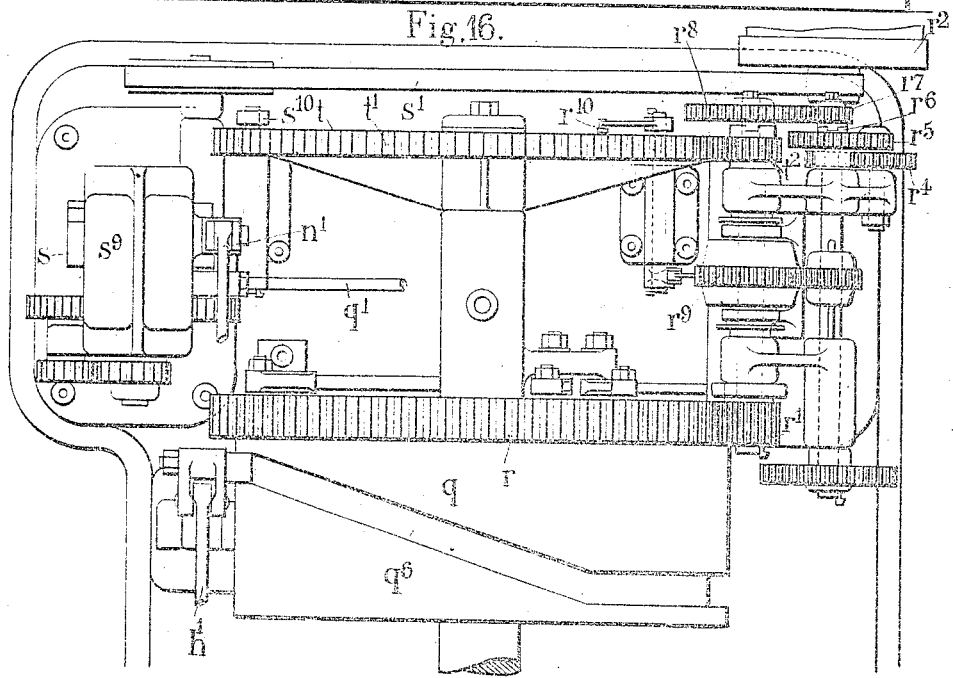
Figure 17:
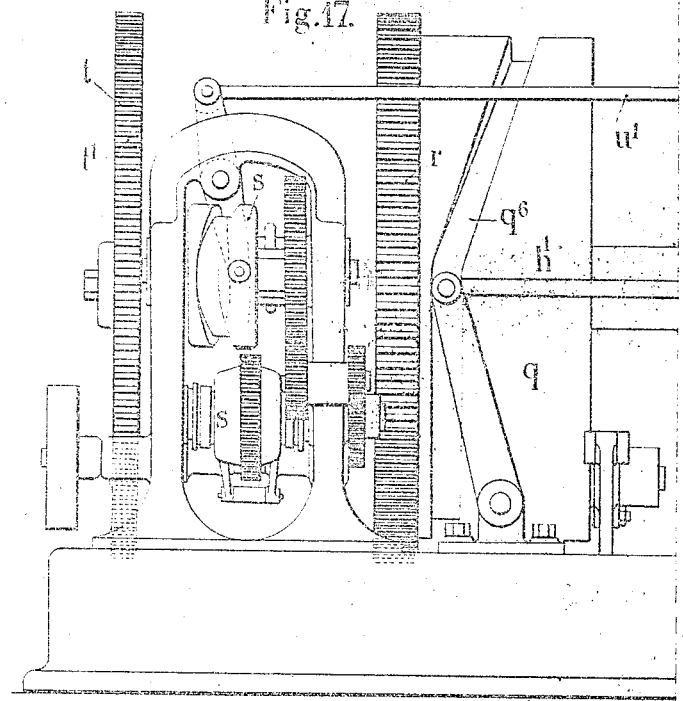

The cams of the first series which impart movement to the shafts $e^1$ $e^2$ $e^3$ $e^4$ $e^5$ and to the rod $h^1$, are united upon a drum $q$. Grooves $q^1$ $q^2$ $q^3$ $q^4$ and $q^5$ are formed on this drum and control the shafts $e^1$ $e^2$ $e^3$ $e^4$ $e^5$ by means of levers $q^{1*}$, $q^{2*}$, $q^{3*}$, $q^{4*}$, $q^{5*}$ and of corresponding connecting rods $e^{1v}$, $e^{2*}$, $e^{3*}$, $e^{4*}$, $e^{5*}$; a groove $q^6$ formed on the periphery, serves to produce the movements of the rod $h^1$ (Fig. 16).

The drum $q$ comprises teeth $r$ meshing with a pinion $r^1$. This pinion is driven by a driving pulley $r^2$ by the intermediary of a train of gearing comprising pinions $r^3$ $r^4$ $r^5$ $r^6$ $r^7$ $r^8$ which may include a change of speed gear and a clutch $r^9$. The latter is arranged in the known manner, so as to accomplish a complete revolution exactly when the lever $r^{10}$ is acted upon and to be declutched automatically as soon as the revolution is complete. If the action upon the lever $r^{10}$ is continued, however, the clutch remains engaged until the lever $r^{10}$ is released and a number of complete revolutions can take place.

The cams of the second series, controlling the tapping and shearing are formed upon a drum $s$ and act respectively by the intermediary of levers and connecting rods on the rod $n^1$ and the shaft $e^6$. The drum $s$ receives its movement from the driving pulley $r^2$ by the intermediary of a belt $s^1$ (Fig. 16), of gear wheels and of a clutch $s^9$ controlled by a lever $s^{10}$ and similar to the clutch $r^9$.

The tapping and gathering operations comprise three phases always consecutive; said phases are produced by three successive central operations upon the lever $s^{10}$; the ratio between the clutch and the drum $s$ is as 3 to 1, so that, when this clutch effects a revolution, the drum $s$ makes one third of a turn; consequently, when the lever $s^{10}$ is acted upon for the first time, the drum is given its first third of a turn, thereby producing the first phase (opening of the obturator $o^9$); a second operation produces a second third of a turn which determines the closing of the obturator $o^9$; finally a third action terminates the complete turn of the drum and thus effects the third phase which is the shearing of the glass.

Finally the motor system comprises the control wheel $t$ which automatically controls the levers $r^{10}$ $s^{10}$.

On its periphery this wheel is provided with teeth $t^1$ driven by pinions $t^2$ $t^3$ $t^7$ (Fig. 16); comprising, if desired, a change speed gear.

There is a constant ratio between the speed of the control wheel $t$ and that of the two cam drums $r$ and $s$, as these three elements receive their movement from the same pulley $r^2$.

The speed of the control wheel is such that the time required for the manufacture of an article comprising the entire cycle of operations, corresponds to a revolution of this wheel.

The control wheel comprises two grooves $t^5$ and $t^6$ in which three dogs $u^1$ $u^2$ and $u^3$ and three blocks $v^1$ $v^2$ $v^3$ can be displaced for the purpose of varying their positions upon the wheel. When the best positions for the dogs and block have been ascertained for treating a glass of given quality in predetermined conditions, it is obvious that these dogs and blocks need not be made adjustable when constructing other machines intended for working glass of the same kind, in the same conditions. These dogs and blocks are arranged in two different planes and the dogs are intended to act upon the lever $s^{10}$ and the blocks upon the lever $r^{10}$, and consequently upon the corresponding clutches.

The motor group, comprising the two series of cams and the control wheel, drive any desired number of molding machines. Fig. 19 shows a certain number of these machines. The shafts $e^1$ $e^2$ . . ., the rod $n^1$ and the shaft $e^6$ are continued for a suitable distance left and right of the motor group and pass through the molding machines to which they impart the necessary movements.

Now considering the motor group and a molding machine as a whole, the operation is as follows:—

Figure 18:
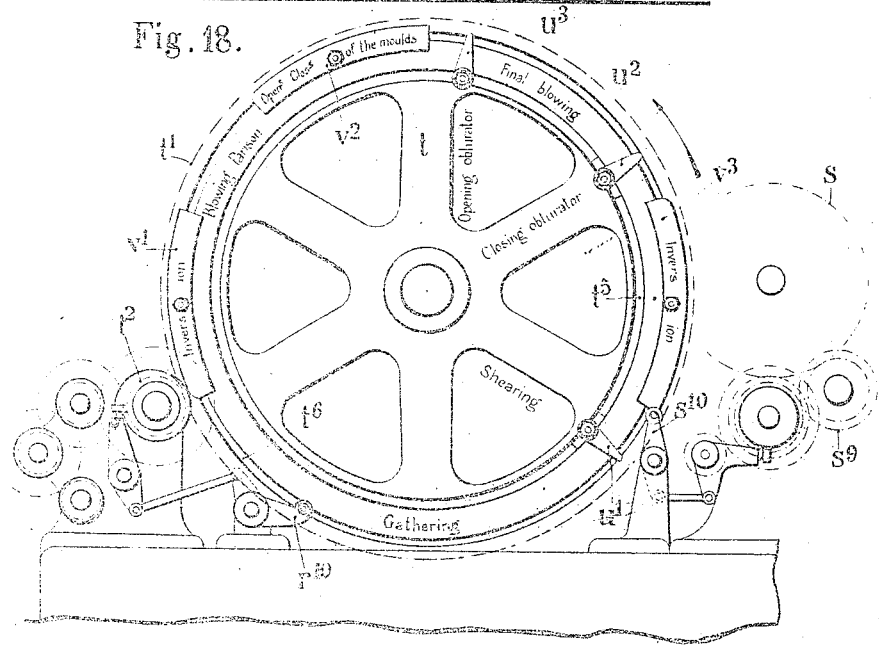

Assuming the control wheel to occupy the position illustrated in Fig. 18, which corresponds to the gathering, and moving in the direction indicated by the arrow, Fig. 18. The dog $u^3$ having already determined the opening of the obturator and consequently the flow of a certain quantity of glass, the dog $u^2$ passes over the lever $s^{10}$ thus throwing in the clutch $s^9$ and producing a rotation of one third of a revolution of the drum $s$ thus bringing about the second phase of the gathering, consisting in the closing of the obturator $o^9$. The melted glass has now filled the parison mold surely filling it to the lowest point of the ring mold owing to its being in communication with the vacuum pump by means of the cock $k^1$. The dog $u^1$ passing in its turn opposite the lever $s^{10}$ again throwing in clutch $s^9$ and producing a fresh rotation of the drum $s$ through one third of a revolution causes the shears to act.

As the control wheel continues to rotate, the block $v^1$ (inversion) acts upon the lever $r^{10}$, which causes the engagement of $r^9$ and the rotation of the pinion $r^1$ which continues during the whole time that the block $v^1$ is in contact with the lever $r^{10}$. The pinion $r^1$ thus accomplishes an exact number of revolutions which correspond to the rotation of the drum $r$ through an exactly predetermined amplitude.

This rotation of the drum $r$ produces the following results:

The parison mold filled with its glass is inverted and assumes a position at an angle at 180° to that represented in Fig. 1. From the commencement of this movement the cover $j$ closes; the punch $f$ is disengaged having started the opening by which the object is to be blown. Finally the cock $k^5$ opens and permits the compressed air to reach the ring mold and the blowing commences.

At the same time the finishing mold opens and the bottle previously manufactured which had remained in this mold until this moment is released and overturned, as represented in Fig. 3.

At this moment the block $v^1$ (inversion) abandons the lever $r^{10}$; declutching takes place and the drum $r$ stops. During this stoppage period, the blowing of the parison is effected the duration of this stoppage being determined at the will of the operator by spacing accordingly the distance between the blocks $v^1$ $v^2$.

The block $v^2$ (opening and closing of the molds) then encounters the lever $r^{10}$ which produces a fresh engagement of $r^9$ and a rotation of several revolutions to which a rotation of the drum $r$ throughout a fraction of a revolution corresponds. This rotation of the drum $r$ produces the following effects:

The supply of compressed air is cut off; the parison mold opens, the parison remaining suspended from the ring mold. The bottom $i$ ascends and supports the parison; the finishing mold closes inclosing the parison. The compressed air is at once readmitted to the ring mold and the final blowing begins. The drum $r$ stops.

The blowing continues for a certain time which can be fixed at will by varying the interval between the blocks $v^2$ and $v^3$ in accordance with the form of the object and the nature of the material employed.

The block $v^3$ (inversion) then acts upon the lever $r^{10}$ which produces the following results:

The supply of air is cut off, the ring mold opens; the ring mold and the parison mold then rotates through 180°, close during this movement and stop beneath the tap-hole. The article manufactured remains inclosed in the finishing mold, with its ring exposed to the air, which enables said ring to cool less quickly (the air being a very bad conductor of heat) and to become reheated under the influence of the heat of the body.

The control wheel has then accomplished a cycle which corresponds to the manufacture of an article. The second cycle is similar and so on in succession.

As will be understood from the foregoing, the durations of each operation of the molding fixed by the control wheel can be regulated at will by displacing the blocks and dogs on the control wheel.

In this manner the machine permits of all desirable modifications of duration of the different phases of the molding; and it can therefore be adapted to all conditions of manufacture.

The operations which take place on the molding machine in question take place simultaneously on all the machines driven by the motor group.

Each machine is readily accessible and is provided with the clutch lever $l$ which permits of stopping certain machines and restarting them without affecting the running of the others.

The arrangements described above are given by way of example only; the forms, dimensions and detail devices may vary according to circumstances without affecting the principle of the invention.

Thus, for instance, the dogs and shoes could be replaced by depressions or hollows in which would drop, under the action of springs, the operating levers.

Claims:

1. In a machine for the manufacture of hollow glass articles, having mechanisms for performing a succession of operations upon the article under manufacture, means including a plurality of rotary cams to actuate said mechanisms, means to rotate said cams, means to stop and start the movements of said cams at points in the cycle of manufacture of an article to determine the commencement and duration of the several operations thereon, and a device to time the starting and duration of the several operating periods of said cams, said device being driven at a rate corresponding to the time cycle of the machine.

2. A machine for the manufacture of hollow glass articles, comprising glass manipulating means, and having a plurality of glass working periods and periods of mechanical movement of the glass manipulating means, actuating means for bringing about said mechanical movements and including a plurality of rotary cams, means for rotating said cams, automatic means for stopping the rotation of said cams at points corresponding to the commencement of said glass working periods and restarting the rotation of said cams after periods corresponding respectively to the duration of said glass working periods, the sum of the time of said stoppage and rotating periods corresponding to the total time cycle of the machine.

3. A machine for the manufacture of hollow glass articles, comprising glass manipulating means, and having a plurality of glass working periods and periods of mechanical movement of the glass manipulating means, actuating means for bringing about said mechanical movements and including a plurality of rotary cams, means for rotating said cams, automatic means for stopping the rotation of said cams at points corresponding to the commencement of said glass working periods and restarting the rotation of said cams after periods corresponding respectively to the duration of said glass working periods, the sum of the times of said stoppage and rotating periods corresponding to the total time cycle of the machine, and said starting and stopping means being adjustable to vary the duration of said glass working periods.

4. In a machine for the manufacture of glass articles, the combination with a plurality of glass-manipulating elements, of a plurality of intermittently actuated cams, means to transmit motion from said cams to the glass manipulating elements, a source of energy and a clutch to connect and disconnect said source of energy to said intermittently actuated cams, and controlling means for said clutch comprising a continuously rotating member and a plurality of clutch actuating elements carried by said rotating member.

5. In a machine for the manufacture of glass articles, the combination with a plurality of glass manipulating elements, of an intermittently actuated drive shaft, means to transmit motion from the drive shaft to the glass manipulating elements comprising a plurality of cams fixed in synchronous relation to said shaft, a source of energy and a clutch to connect and disconnect said source of energy to the drive shaft, and controlling means for said clutch comprising a controlling member continuously rotating at a uniform rate of speed corresponding to the time cycle of the machine, and clutch actuating elements adjustably mounted on said controlling member.

6. In an automatic kinematically actuated machine for manufacturing glass objects, having movable molds and carriers therefor, a control device adapted to determine stoppage periods of said molds and mold carriers during which the glass working operations take place, means for imparting to said control device a movement corresponding to the cycle of the manufacture, a rotary member provided with several cams controlling the movements of said molds, and means for starting, stopping and restarting said rotary member, said control device including control contacts carried thereby and acting upon said starting, stopping and restarting mechanism of the rotary member to control the movements of the molds.

7. In a machine for manufacturing glass articles, the combination with glass working and glass handling elements, of revolving cams adapted to actuate said elements, means for controlling the rotation of said cams and comprising a control device having an independent motion corresponding to the cycle of manufacture and contact pieces carried by said control device, a rotary clutch acted upon by said contact pieces for establishing and interrupting the rotary movement of the above cams, a continuously revolving shaft associated with said clutch, and means for assuring that the clutching and declutching action will always take place at the same point of the revolution of the clutch.

8. In a machine for manufacturing glass articles a plurality of glass working and handling devices, means for actuating said devices in proper succession, said means including a revolving multiple cam, and a control device having an independent movement corresponding to the cycle of manufacture and provided with adjustable contact pieces whereby the movement of the multiple cam is started and stopped.

9. In a machine for manufacturing glass articles a plurality of glass working and handling devices, means for actuating said devices in proper succession, said means including a revolving multiple cam, a continuously revolving control device, said control device making one revolution per cycle of manufacture, contact pieces carried by said device, and a clutch device actuated by said contact pieces to intermittently start and stop said cam.

The foregoing specification of my automatic machine for molding glass articles signed by me this eleventh day of March 1912.

ARTHUR WILZIN.

Witnesses:
E. VANDENPLAS,
CHARLES ROY NASMITH.